No. 763,259. PATENTED JUNE 21, 1904.
A. E. CATTERMOLE.
CLASSIFICATION OF THE METALLIC CONSTITUENTS OF ORES.
APPLICATION FILED SEPT. 29, 1903.
NO MODEL.
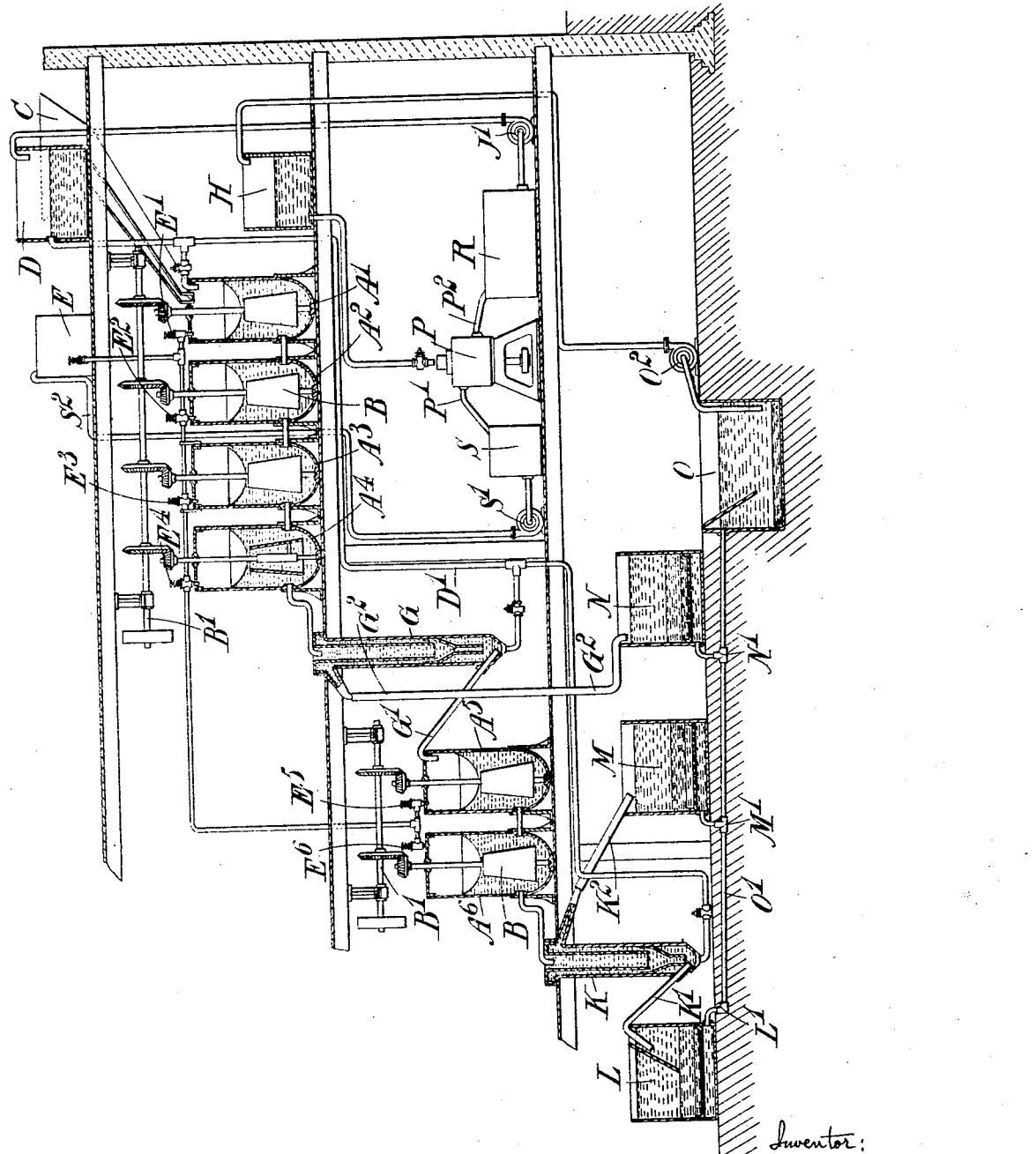
Witnesses:
Inventor:
Arthur E. Cattermole.
By Knight Bros.
Attorneys No. 763,259.

Patented June 21, 1904.

UNITED STATES PATENT OFFICE.

ARTHUR EDWARD CATTERMOLE, OF LONDON, ENGLAND.

CLASSIFICATION OF THE METALLIC CONSTITUENTS OF ORES.

SPECIFICATION forming part of Letters Patent No. 763,259, dated June 21, 1904.

Application filed September 29, 1903. Serial No. 175,060. (No specimens.)

*To all whom it may concern:*

Be it known that I, ARTHUR EDWARD CATTERMOLE, a subject of the King of England, residing at London, England, have invented certain new and useful Improvements in the Classification of the Metallic Constituents of Ores, of which the following is a specification.

The present invention relates to the classification of the metalliferous constituents of ores which have been separated from gangue by oil or similar matter, such as certain wood or coal tar products, hereinafter referred to as "oil," in which term I also include the emulsifying agent when an emulsifying agent is present with the oil.

The invention consists in fractionally removing the different constituents from the agglomerated masses by freeing the constituents in turn from the oil, and thus obtaining them in a separable condition by the use of emulsifying agents of varying strength and activity, preferably in conjunction with an alkali.

In carrying out the process the metalliferous mineral matter agglomerated by oil is mixed and agitated with a solution of an emulsifying agent, such as a soluble soap—alkaline oleate, for example—to which a certain proportion of soluble alkali, preferably caustic potash or soda, has been added.

It is found that minerals vary in their affinity for oil employed in the above manner, and thus by treating the oily masses or granules in the first place with an alkaline emulsifying solution of a certain strength the mineral of least affinity can be separated therefrom and by increasing the strength or modifying the proportions of the breaking-down solution step by step the various metalliferous constituents may be thrown out in the order of their increasing affinities. Taking, for example, an ore containing siliceous gangue, rosin-blende, copper pyrites, and galena, the ore is first treated with oil or emulsified oil for the granulation of the metalliferous mineral. The oil is preferably one such, for example, as a hydrocarbon oil which is not too readily emulsified and which gives a wide range of strength in the solutions required for breaking down the granules. The compound granules separated from the siliceous gangue and liquor are drained and run into the first classifying apparatus, where they are agitated with a solution, which may have, say, a strength of three-fourths of one per cent. soap (when this is the emulsifying agent employed) and of three-fourths of one per cent. alkali, by which the rosin-blende is dropped out. The granules remaining freed from blende and liquor are then passed onto a second similar apparatus in which a solution of a strength of, say, one and one-half per cent. soap, one and one-half per cent. alkali is used. Here the copper pyrites is freed and subsequently removed, the galena remaining still granulated. The oil may finally be recovered from these granules by the use of a solution of suitable—*i. e.*, sufficient—strength of alkali and emulsifying agent, and its separation from the mineral may be promoted by attrition.

The strength of the breaking-down solutions required and the relative proportions of their constituents depend mainly upon the following conditions—that is to say, upon the state of fineness of the ore treated, the relative proportions of the contained minerals one to another, their physical condition and chemical composition, the nature of the oil, emulsifying agent, and alkali used.

The example above given indicates for an ore such as is there supposed to be under treatment and for the oil and emulsifying agent mentioned in what proportions these agents should be employed. In the case of another ore and of other reagents these proportions may need to be readjusted, and for the purpose of such readjustment the following rules may be laid down. The finer the ore the more compact and cohesive are the granules formed from it, other things being equal, and therefore stronger breaking-down solution will be required with a finely-ground ore than with one coarsely ground. With granules where minerals, such as galena, which offer great resistance to the breaking-down action of the solution preponderate the breaking-down solution should of course be stronger or more active than in the alternative case, (where mineral such as rosin-blende, which offers less resistance to the breaking-down solution preponderates.)

In considering the chemical composition of the minerals it is of course necessary to bear in mind that a constituent mineral—say, for example, zinc-blende—may contain impurities or other metalliferous constituents (such as iron sulfid) which will materially affect their resistance to the breaking-down action of the solution, in the case supposed increasing such resistance.

With regard to the nature of the oil: With the animal or vegetable oils or readily-emulsified oils the breaking down is comparatively rapid and may be too rapid for conveniently carrying out this process. With heavy residuum oils and other heavy hydrocarbon oils, which are emulsified with difficulty, the breaking down is comparatively difficult and slow. Oils may be blended for the purpose of obtaining a mixture which suits the requirements of any particular mineral mixture which may be under treatment. The breaking down is effected most advantageously with emulsifying agents and alkali which are readily soluble. Bearing these principles in mind, the operator will always be able to determine by observations made in the course of working, or, if he so prefers, by a few simple preliminary tests, under what conditions this process can be worked to the best advantage.

In the upcurrent or other separating device for removing the freed mineral from the granules remaining solution of the same strength as that used in "breaking down" may be employed, or it may be somewhat weakened by dilution, so long as the reagglomeration of the separated mineral does not take place.

The more or less emulsified oil removed from the granules separates out as a "cream" or concentrated emulsion from the breaking-down solution employed, and the separation of such oil for reuse in the various stages and recovery of oil-depleted solution for reuse in the breaking-down stage may be hastened by the employment of mechanical separators. Since oil is being removed in each breaking-down stage, it is generally preferable to start with the compound mineral granules in a rather soft or pasty condition by the use of a sufficiency of oil in the granulating stage, or, if necessary, the granules from one stage if reduced too small by removal of oil for ready separation may be again treated with oil or oil emulsion, or oil or oil emulsion may be added to the breaking-down solutions in the requisite small amounts to keep the granules of proper size and consistency to be dealt with in the separating devices in use. The presence of a certain amount of oil in the solutions assists separation by preventing the too ready breaking down of the granules.

The separated minerals may be drained or treated in centrifugal or other mechanical solution-extractors for the closer recovery of solution and drying of the product.

The accompanying drawing is a diagram illustrating in sectional view one method of carrying out the process according to this invention as applied to a mixed sulfid ore—Broken Hill ore, for example—consisting of galena and blende.

A series of connected mixing vessels $A'$ $A^2$ $A^3$ $A^4$ $A^5$ $A^6$ are provided with stirrers B, rotated from driving-shafts $B'$. The oily granulated mixture of galena and black blende freed from the gangue from the hopper C and breaking-down solution, which may have a strength of one-half of one per cent. alkaline oleate and one and one-half per cent. caustic alkali, from a tank D are introduced into the first vessel $A'$, and the oil or emulsion needed to keep the granules of suitable size and consistency is fed as required from the tank E through pipes and regulating-taps $E'$ $E^2$ $E^3$ to the various vessels. The mixture is vigorously agitated to break down the mixed granules and liberate the blende. After agitating to a certain extent (in four communicating vessels, as illustrated, for example,) the mixture is passed into an upcurrent classifier G, which is supplied with solution from the tank D through a pipe $D'$. The partly-broken-down granules and the heavier particles of liberated blende are discharged through a pipe $G'$ into the vessel $A^5$, while the lighter particles of blende are carried away by the upward current and discharged through outlet-pipe $G^2$ to the tank N, provided with a filter-bottom for the draining of the product. The solution is allowed to run by the pipes $N'$ and $O'$ into a tank O, from which the solution may be returned by the pump $O^2$ to the tank H. The granules and coarser blende are subjected to further agitation in the vessels $A^5$ $A^6$, where the separation of the blende is completed, and are then passed into a second classifier K, from which the galena granules are removed at the bottom by the pipe $K'$ into the tank L, while the blende is discharged from the upper pipe $K^2$ into the tank M. Like N the tanks L M are provided with a filter-bottom, and the solution that drains away is led by the pipes $L'$ $M'$ and pipe $O'$ into the tank O for pumping up to the tank H. The solution thus returned to this tank contains the oil removed from the granules and is thence run into a centrifugal separator P, whence the oil escapes through a pipe $P'$ to a tank S, while the solution, deprived more or less completely of oil or oil emulsion, runs into a tank R and is thence returned by the pump $J'$ to the feed-tank D for reuse. The separated oil or oil emulsion in the tank S is returned by the pump $S'$ through a pipe $S^2$ to the oil or emulsion tank E. This apparatus is illustrated only as one convenient method of carrying out this invention, and it is to be understood that its nature and arrangement can be considerably varied.

The process, it will be seen, comprises two steps which are essentially distinct—first, the removal of certain constituents from the agglomerated masses or granules, and, second, the separation of the material so removed from the remaining granules. In the apparatus described and illustrated in the accompanying drawing, I have provided for the carrying out of these two stages of the process in separate vessels, (mixers and separators, respectively;) but it will be readily understood that the apparatus and process can, if desired, be so modified that all the operations may be carried on in a single vessel, and similarly the various parts of the apparatus may be modified in a great many ways to suit special conditions of working.

In some cases, as when one of the mineral constituents is small in amount, particularly when among the last to be separated, it may be increased up to the required point for ready separation by incorporating the requisite amount with the initial mixed granules or by addition to the product in the apparatus in which the breaking down is effected. A certain amount of already-separated mineral may be returned for this purpose, or where, owing to the absence of sufficient fine or slime material weakly-coherent granules breaking down too readily are obtained, such fine mineral may be added, as described, to render such granules more coherent and resistant. In other cases with the same object in view it may be advantageous to subject the granulated mixed mineral to grinding action to further reduce the size of the constituent mineral particles without destroying the agglomeration before breaking down and separation of the constituents.

When minerals granulated with some tarry products are treated, an alkaline breaking-down solution with an emulsifying agent of analogous nature may with advantage be employed. For example, when granulated with wood-tar an alkaline solution of the tar of suitable proportions and strength is the most suitable liquor to be employed for breaking down and separation of the minerals.

What I claim as my invention, and desire to secure by Letters Patent, is—

1. The herein-described process of classifying metalliferous minerals agglomerated by oil which consists in successively agitating the agglomerated mineral with emulsifying agents of varying strength progressively to free the several minerals in succession.

2. The herein-described process of classifying metalliferous minerals agglomerated by oil which consists in successively agitating the agglomerated mineral with emulsifying agents of varying strength progressively to free the several minerals in succession separating out each mineral in turn by a separating device and adding oil in the requisite small amounts to keep the granules of proper size and consistency.

3. The herein-described process of classifying metalliferous minerals agglomerated by oil which consists in successively agitating the agglomerated mineral with solutions of soap and caustic alkali of varying strength progressively to free the several minerals in succession.

4. The herein-described process of classifying metalliferous minerals agglomerated by oil which consists in successively agitating the agglomerated mineral with solutions of soap and caustic alkali of varying strength progressively to free the several minerals in succession and separating out each mineral in turn by an upward current.

5. The herein-described process of classifying metalliferous minerals agglomerated by oil which consists in successively agitating the agglomerated mineral with solutions of soap and caustic alkali of varying strength progressively to free the several minerals in succession separating out each mineral in turn by an upward current and adding oil in the requisite small amounts to keep the granules of proper size and consistency.

In testimony whereof I have signed my name to this specification in the presence of two subscribing witnesses.

ARTHUR EDWARD CATTERMOLE.

Witnesses:
HASOP WADE,
HARRY S. GRIDGE.